(12) United States Patent
Mullin (10) Patent No.: US 8,901,867 B2
(45) Date of Patent: Dec. 2, 2014

(54) ELECTRICAL MACHINE, METHOD OF CONTROLLING AN ELECTRICAL MACHINE, AND SYSTEM INCLUDING AN ELECTRICAL MACHINE

(75) Inventor: Paul Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 753 days.

(21) Appl. No.: 13/096,537

(22) Filed: Apr. 28, 2011

(65) Prior Publication Data
US 2012/0274249 A1 Nov. 1, 2012

(51) Int. Cl.
H02P 1/04 (2006.01)
H02P 6/04 (2006.01)
H02P 6/18 (2006.01)
H02P 6/20 (2006.01)

(52) U.S. Cl.
CPC .............. *H02P 6/205* (2013.01); *H02P 6/182* (2013.01)
USPC ............ 318/400.33; 318/400.11; 318/400.42; 318/696

(58) Field of Classification Search
CPC ....................................................... H02P 6/205
USPC ................... 318/400.33, 400.11, 400.42, 696
See application file for complete search history.

(56) References Cited

U.S. PATENT DOCUMENTS

| | | | |
|---|---|---|---|
| 3,636,429 A | 1/1972 | Jakubowski et al. | |
| 3,663,880 A | 5/1972 | Gabor | |
| 4,286,202 A | 8/1981 | Clancy et al. | |
| 4,673,849 A | 6/1987 | Sears et al. | |
| 4,743,815 A * | 5/1988 | Gee et al. ................ | 318/400.11 |
| 4,896,089 A | 1/1990 | Kliman et al. | |
| 5,001,405 A | 3/1991 | Cassat | |
| 5,003,241 A | 3/1991 | Rowan et al. | |
| 5,012,166 A | 4/1991 | Ushijima et al. | |
| 5,198,733 A | 3/1993 | Wright | |
| 5,223,771 A | 6/1993 | Chari | |
| 5,235,264 A | 8/1993 | Kaneda et al. | |
| 5,298,838 A | 3/1994 | Peters et al. | |
| 5,343,127 A | 8/1994 | Maiocchi | |
| 5,350,984 A | 9/1994 | Carobolante et al. | |

(Continued)

FOREIGN PATENT DOCUMENTS

| WO | 2005/043713 | 5/2005 |
|---|---|---|
| WO | 2012/149237 | 11/2012 |

OTHER PUBLICATIONS

PCT/US2012/035329 International Search Report and Written Opinion dated Jun. 5, 2013 (10 pages).

(Continued)

*Primary Examiner* — Erick Glass
(74) *Attorney, Agent, or Firm* — Michael Best & Friedrich LLP (57) ABSTRACT

A method of controlling an electrical machine. The electrical machine includes a stator having a core and a plurality of windings, and a rotor disposed adjacent to the stator to interact with the stator. The method includes detecting a movement of the rotor, generating a three phase alternating current (AC) voltage signal by all phases of the electrical machine, monitoring for a transfer speed of the electrical machine, discontinuing the three phase AC voltage signal when the transfer speed is traversed, and switching to a back electromotive force (BEMF) control mode after discontinuing the three phase AC voltage signal.

19 Claims, 5 Drawing Sheets

(56) References Cited

U.S. PATENT DOCUMENTS

| | | | |
|---|---|---|---|
| 5,397,972 | A | 3/1995 | Maiocchi |
| 5,466,999 | A | 11/1995 | Hutsell |
| 5,537,020 | A | 7/1996 | Couture et al. |
| 5,572,097 | A | 11/1996 | Cameron |
| 5,623,379 | A | 4/1997 | Nishimura et al. |
| 5,672,944 | A | 9/1997 | Gokhale et al. |
| 5,712,539 | A | 1/1998 | Zweighaft et al. |
| 5,777,449 | A | 7/1998 | Schlager |
| 5,796,227 | A | 8/1998 | Sears et al. |
| 5,834,911 | A | 11/1998 | Kimura |
| 5,847,535 | A | 12/1998 | Nordquist et al. |
| 5,986,419 | A | 11/1999 | Archer et al. |
| 5,998,946 | A | 12/1999 | Kim |
| 6,002,226 | A | 12/1999 | Collier-Hallman et al. |
| 6,014,003 | A | 1/2000 | French |
| 6,034,493 | A | 3/2000 | Boyd et al. |
| 6,091,222 | A | 7/2000 | Vertemara et al. |
| 6,100,656 | A | 8/2000 | El-Sadi et al. |
| 6,107,772 | A | 8/2000 | Liu et al. |
| 6,160,367 | A | 12/2000 | Higashi et al. |
| 6,229,274 | B1 | 5/2001 | Vertemara et al. |
| 6,249,096 | B1 | 6/2001 | Shin |
| 6,249,101 | B1 | 6/2001 | Viti et al. |
| 6,326,752 | B1 | 12/2001 | Jensen et al. |
| 6,342,770 | B1 | 1/2002 | Stephan et al. |
| 6,483,266 | B2 | 11/2002 | Miyazaki et al. |
| 6,512,343 | B1 | 1/2003 | Yasohara |
| 6,534,938 | B1 | 3/2003 | Wu et al. |
| 6,538,403 | B2 | 3/2003 | Gorti et al. |
| 6,541,928 | B2 | 4/2003 | Eroglu et al. |
| 6,563,286 | B2 | 5/2003 | Seki et al. |
| 6,566,830 | B2 | 5/2003 | Walters |
| 6,570,351 | B2 | 5/2003 | Miyazaki et al. |
| 6,570,353 | B2 | 5/2003 | Krotsch et al. |
| 6,639,371 | B2 | 10/2003 | Walters et al. |
| 6,653,811 | B2 | 11/2003 | Branecky |
| 6,724,166 | B2 | 4/2004 | Narumi et al. |
| 6,741,046 | B1 | 5/2004 | Krauth et al. |
| 6,750,627 | B2 | 6/2004 | Holdaway |
| 6,754,151 | B2 * | 6/2004 | Watt ........................... 369/47.36 |
| 6,765,358 | B1 | 7/2004 | Noble et al. |
| 6,774,590 | B2 | 8/2004 | Inagawa et al. |
| 6,803,737 | B2 | 10/2004 | Scheidegger et al. |
| 6,850,022 | B2 | 2/2005 | Liu et al. |
| 6,859,001 | B2 | 2/2005 | Kane et al. |
| 6,900,604 | B2 | 5/2005 | Kokami et al. |
| 6,995,530 | B2 | 2/2006 | Biamonte et al. |
| 7,088,064 | B2 | 8/2006 | Brakelmann et al. |
| 7,095,204 | B2 | 8/2006 | Lee et al. |
| 7,112,936 | B2 | 9/2006 | Lee |
| 7,242,175 | B2 | 7/2007 | Shao et al. |
| 7,256,564 | B2 | 8/2007 | Mackay |
| 7,443,128 | B2 * | 10/2008 | Bieler et al. .................. 318/723 |
| 7,489,097 | B2 * | 2/2009 | Fu et al. ................... 318/400.01 |
| 7,514,887 | B2 | 4/2009 | Mullin et al. |
| 8,084,970 | B2 | 12/2011 | Mullin et al. |
| 8,587,233 | B2 * | 11/2013 | Bass et al. ................ 318/400.11 |
| 2001/0030517 | A1 | 10/2001 | Batzel |
| 2002/0033688 | A1 | 3/2002 | Viti |
| 2002/0043954 | A1 | 4/2002 | Hallidy |
| 2002/0050800 | A1 | 5/2002 | Miyazaki et al. |
| 2003/0062860 | A1 | 4/2003 | Wu et al. |
| 2003/0231875 | A1 | 12/2003 | Masino |
| 2005/0110442 | A1 * | 5/2005 | Trifilo .......................... 318/254 |
| 2005/0156545 | A1 | 7/2005 | Mueller et al. |
| 2005/0237017 | A1 | 10/2005 | Biamonte et al. |
| 2006/0284581 | A1 | 12/2006 | Mullin et al. |
| 2009/0160384 | A1 | 6/2009 | Mullin et al. |
| 2010/0148710 | A1 | 6/2010 | Lim et al. |

OTHER PUBLICATIONS

Fairchild Semiconductor Corporation, Application Brief 42020, The SmartStart™ Technique for BLDC Motors, Sep. 1996, Revised Oct. 25, 2000.
United States Patent Office Action for U.S. Appl. No. 11/379,607 dated May 13, 2008 (31 pages).
United States Patent Office Action for U.S. Appl. No. 11/379,607 dated Dec. 2, 2008 (6 pages).
United States Patent Office Action for U.S. Appl. No. 12/398,675 dated Feb. 16, 2011 (8 pages).
United States Patent Office Action for U.S. Appl. No. 12/398,675 dated Aug. 31, 2011 (8 pages).
Mexican Office Action for Application No. PA/A/2006/004530 dated Apr. 28, 2009 (3 pages).
International Search Report for Application No. PCT/US2004/034938 dated Mar. 31, 2006 (1 page).
Written Opinion for Application No. PCT/US2004/034938 dated Mar. 31, 2006 (3 pages).
Mexican Office Action for Application No. PA/A/2006/004530 dated Sep. 30, 2009 (2 pages).
Mexican Office Action for Application No. PA/A/2006/004530 dated Apr. 27, 2010 (4 pages).
Mexican Office Action for Application No. MX/a/2009/009953 dated Sep. 6, 2011 (4 pages).
Canadian Patent Office Action for Application No. 2543413 dated Feb. 1, 2012 (3 pages).
Canadian Patent Office Action for Application No. 2544557 dated Jul. 22, 2013 (10 pages).
European Patent Office Action for Application No. 12718552.8 dated Feb. 5, 2014 (1 page).

* cited by examiner

ELECTRICAL MACHINE, METHOD OF CONTROLLING AN ELECTRICAL MACHINE, AND SYSTEM INCLUDING AN ELECTRICAL MACHINE

FIELD OF THE INVENTION

The invention relates to an electrical machine and specifically a brushless, permanent magnet electrical machine. In particular, the invention relates to a system including a brushless direct current (BLDC) motor and a method for starting a BLDC motor.

BACKGROUND

BLDC motors (also known as electronically commutated or "ECM" motors) are becoming more prevalent in industries that typically did not use BLDC motors. For example, the need for increased efficiency in the heating and air conditioning market has led to the use of BLDC motors for powering the blower in heating, ventilation, and/or air conditioning systems (referred to herein as HVAC systems). An HVAC system is one example of an air-movement system. Other example air-movement systems include furnaces, heat pumps, blowers for gas-fired appliances (e.g., a gas water heater), etc.

Generally, BLDC motors are synchronous electric motors powered by direct-current ("DC") electricity and have electronic commutation, rather than mechanical commutators and brushes. Further, BLDC motors include a rotor having a plurality of magnetic poles (e.g., a plurality of poles produced with permanent magnets) of alternating polarity disposed on a surface of a rotor core, and a stator that receives electrical power and produces a magnetic field in response thereto. The magnetic field of the stator interacts with a magnetic field of the rotor to cause movement of the rotor.

SUMMARY

BLDC motors use a means for determining the position of the rotor in order to commutate the motor. One method of commutating the motor is referred to as "sensorless" motor commutation. Sensorless motor commutation is often performed by sensing the back electromotive force (BEMF) produced by the motor. Typically, the BEMF signal produced in the stator windings is not large enough for sensorless motor commutation until the speed of the rotor reaches about ten percent of the rated motor speed. As a result, a means of starting the motor without using the BEMF signal may be necessary.

One method of starting a three-phase motor is described in U.S. Publication No. 2009/0160384, which is fully incorporated herein by reference. Typically, to start the BLDC motor, a controller aligns the rotor of the motor to a known position and then accelerates the rotor (e.g., by using the method described in U.S. patent application Ser. No. 12/398,675). Once the rotor reaches a sufficient speed, the rotor is allowed to coast for a short time (e.g., 20-200 ms) while the controller synchronizes the rotor to engage a normal running mode. During this startup process the air-movement system can generate ramp up noise. In particular, the power signal provided to the rotor can generate torsional torque ripple that excites system vibration modes and results in an audible noise for a short period during ramp up. Therefore, there is a need for an improved method for starting brushless electrical machines and BLDC motors, where the ramp up noise during the startup of the motor is avoided.

In one embodiment, the invention provides a method of controlling an electrical machine including a stator having a core and a plurality of windings, and a rotor disposed adjacent to the stator to interact with the stator. The method includes detecting a movement of the rotor, generating a three phase alternating current (AC) voltage signal by all phases of the electrical machine, monitoring for a transfer speed of the electrical machine, discontinuing the three phase AC voltage signal when the transfer speed is traversed, and switching to a back electromotive force (BEMF) control mode after discontinuing the three phase AC voltage signal.

In another embodiment, the invention provides an electrical machine including a stator having a core and a plurality of windings, a rotor disposed adjacent to the stator to interact with the stator, a memory, and a controller arranged to start the electrical machine. The controller is configured to detect a movement of the rotor, generate a three phase alternating current (AC) voltage signal by all phases of the electrical machine, monitor for a transfer speed of the electrical machine, discontinue the three phase AC voltage signal when the transfer speed is traversed, and switch to a back electromotive force (BEMF) control mode after the three phase AC voltage signal is discontinued.

In yet another embodiment, the invention provides an air-movement system including a system control board and a motor assembly including a stator having a core and a plurality of windings, and a rotor disposed adjacent to the stator to interact with the stator. The air-movement system further includes a drive circuit coupled to the motor assembly and having a controller and a memory, the controller being configured to start the motor assembly. Starting of the motor assembly includes detecting a movement of the rotor, generating a three phase alternating current (AC) voltage signal by all phases of the motor assembly, and discontinuing the three phase AC voltage signal when the motor assembly traverses a transfer speed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
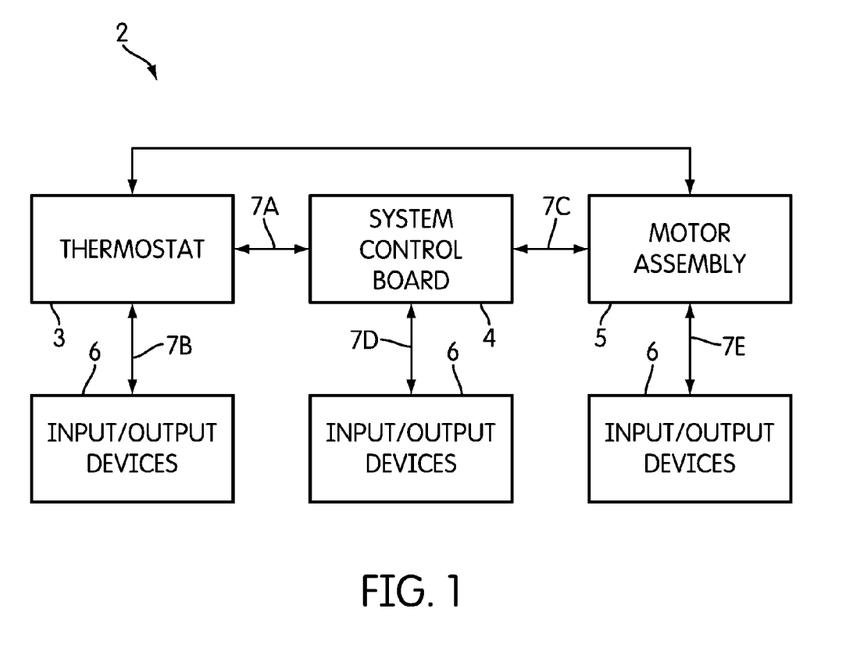
FIG. 1 is a schematic illustration of an HVAC system including a thermostat, system control board, and a brushless permanent magnet electrical machine.

FIG. 1 illustrates an HVAC system 2 including a thermostat 3, a system control board 4, a motor assembly 5, and input/ output devices 6. The thermostat 3 is coupled to the system control board 4 via a first communication line 7A, and to one or more input/output devices 6 via a second communication line 7B. Additionally, the thermostat 3 can be coupled directly to the motor assembly 5. The system control board 4 is coupled to the motor assembly 5 via a third communication line 7C, and to one or more input/output devices 6 via a forth communication line 7D. The motor assembly 5 is coupled to one or more input/output devices 6 via a fifth communication line 7E. As shown in FIG. 1, the communication lines 7A-7E can represent a two-way system communication between the elements described above. Moreover, communication lines are schematic only, can include analog or digital communication, and can include wire or wireless communication.

Each one of the input/output devices 6 is also a schematic representation of input signals, output signals, and auxiliary devices operating in connection with the thermostat 3, the system control board 4, and the motor assembly 5. Accordingly, more than one implementation of the construction of the HVAC system 2 is shown in FIG. 1. Moreover, other constructions of the HVAC system 2 can be possible by utilizing one, or a combination, of the primary devices (e.g. thermostat 3, system control board 4, and motor assembly 5) and a number of input/output devices 6. Additionally, it is envisioned that the primary devices discussed further below (e.g., the motor assembly 5) can be used in other applications, either independently or simultaneously with respect to the operation of the HVAC system 2.

In one construction, the thermostat 3 can include a set of ports (not shown) used to send output signals generated by the thermostat 3. For example, the output signals generated by the thermostat 3 can include signals indicative of the status of the HVAC system 2 based on the input signals (e.g. ambient temperature and/or humidity levels) received by the thermostat 3. The thermostat 3 can generate output signals, for example heating (W) and cooling (Y), such that the signals can be interpreted by receiving devices (e.g. the system control board 4) as being "on" or "off." For example, the thermostat can generate a signal W (i.e., a request for heating) through one of the output ports. The signal W can be interpreted by the system control board 4, and as a result, the system control board 4 can generate a signal instructing or causing the motor assembly 5 to operate. In some constructions, the thermostat 3 is configured to generate signals indicative of requests of different levels of heating or cooling.

It is to be understood that the HVAC system 2 illustrated in FIG. 1 represents only one exemplary construction of an air-movement system, and thus other constructions are possible. Therefore, the operation of the HVAC system 2 can be implemented in other air-movement systems that include BLDC motors. For example, similar air-movement systems can include furnaces, heat pumps, blowers for gas-fired appliances (e.g., a gas water heater), etc. Further, the HVAC system 2 (or any other air-movement system) can operate the motor assembly 5 without the input from a thermostat 3. In these constructions, the system control board 4 of the air-movement system 2 can generate a signal instructing the motor assembly 5 to operate based on an input from other external devices or based on a request from an internal module of the system 2.

In one construction, the system control board 4 can relay signals generated by the thermostat 3 to the motor assembly 5. More specifically, the system control board 4 processes the signals from the thermostat 3 and generates instructions for operating the motor assembly 5. The system control board 4 can also be operable to communicate with other input/output devices 6, such as humidity control systems, gas burner controls, gas ignition systems, other motors, safety systems, service systems, and combustion blowers. Accordingly, the system control board 4 can generate instructions for the motor assembly 5 based on signals received from the thermostat 3, as well as signals received from alternative devices coupled to the system control board 4, such as safety systems, ambient sensors, gas ignition systems, and other HVAC system components.

In some constructions of the HVAC system 2, the system control board 4 communicates with the motor assembly 5 utilizing at least one serial port. More specifically, the system control board 4 and the motor assembly 5 can be coupled via a serial cable. In some cases, the system control board 4 can generate and send instructions to the motor assembly 5, as well as receive diagnostics from the motor assembly 5 via the same serial port. In other cases, the motor assembly 5 and the system control board 4 can send and receive other information besides instructions and diagnostics utilizing the serial ports based on an operational mode of the system control board 4.

Figure 2:
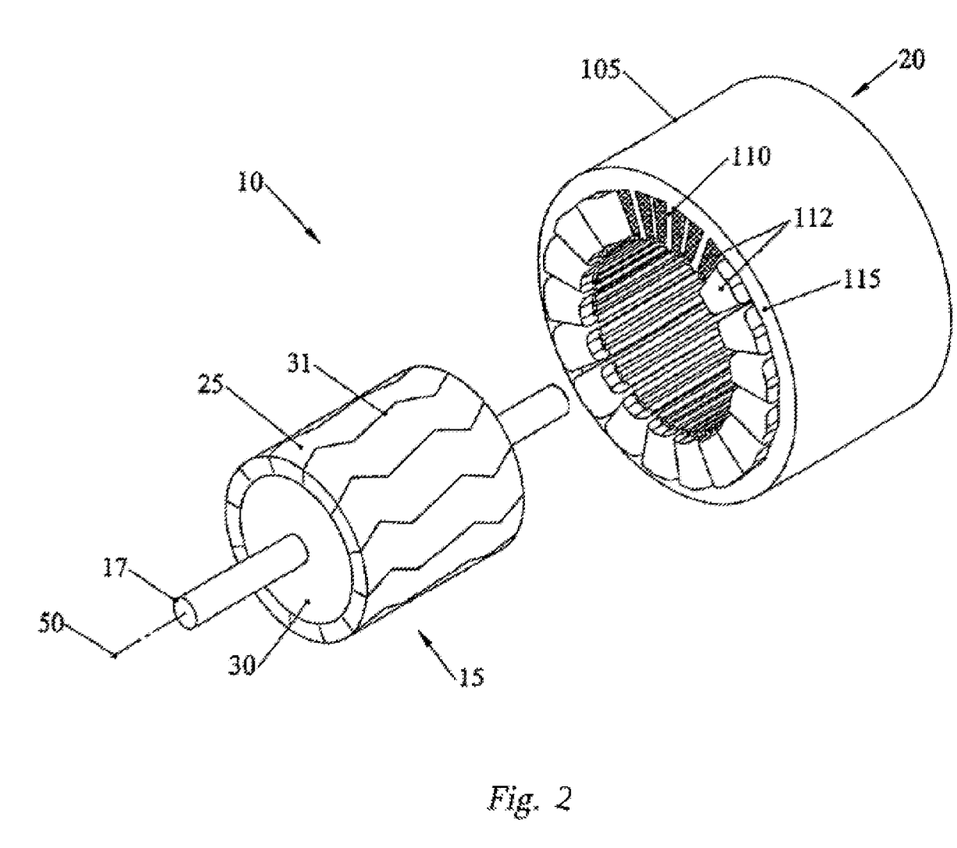
FIG. 2 is a partial exploded view of the stator and rotor of the brushless permanent magnet electrical machine of FIG. 1.
Figure 3:
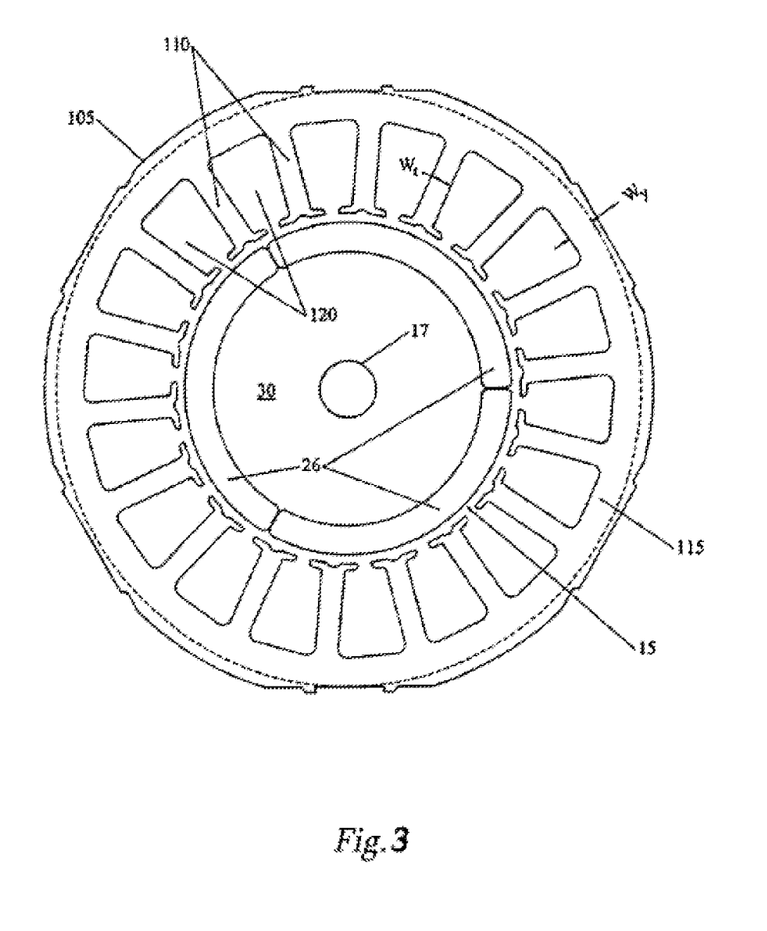
FIG. 3 is a cross-sectional view of the stator and rotor of FIG. 2.

In one construction, the motor assembly 5 includes a permanent magnet, brushless direct current (BLDC) motor. FIGS. 2-3 illustrate portions of an exemplary BLDC motor. However, the invention is not limited to the motor disclosed in FIGS. 2-3; other BLDC motors or electrically commutated motors (ECMs) can incorporate the invention. Although the BLDC motor is described in relation to an air-movement system (e.g., HVAC system), it is understood that the described BLDC motor incorporating the invention can be implemented in other systems and used in different industries.

FIG. 2 is a partial exploded view of the stator and rotor of an electrical machine (e.g., motor) according to one construction of the motor assembly 5. For FIG. 2, the electrical machine is a motor 10 having a rotor 15 and a stator 20. The rotor 15 is coupled to a shaft 17 and held by one or more bearings. In general, the stator 20 receives electrical power, and produces a magnetic field in response thereto. The magnetic field of the stator 20 interacts with a magnetic field of the rotor 15 to produce mechanical power with the shaft 17.

The rotor 15 includes a plurality of magnetic poles 25 of alternating polarity exhibited on a surface of a rotor core 30. The rotor core 30 includes laminations (e.g., magnetic steel laminations), and/or solid material (e.g., a solid magnetic steel core), and/or compressed powdered material (e.g., compressed powder of magnetic steel). One construction of the rotor 15 includes a sheet of permanent magnet (e.g., hard magnetic) material disposed on the rotor core 30. Another construction of the rotor 15 can include a plurality of strips of permanent magnet material attached (e.g., with adhesive) around the core 30. The permanent magnet material can be magnetized by a magnetizer to provide a plurality of alternating magnetic poles. Additionally, the number of magnetic strips can be different than the number of rotor magnetic poles. Yet another construction of the rotor 15 contains blocks of permanent magnet material placed inside the rotor core 30.

It is to be understood that the description of the invention is not limited to a particular mechanical construction, geometry, or position of the rotor 15. For example, FIG. 3 shows the rotor 15 located inside and separated by a radial air gap from the stator 20. In another construction of the motor 10, the rotor 15 can be positioned radially exterior to the stator 20 (i.e., the machine is an external- or outer-rotor machine).

One method to reduce cogging and ripple torque, which may arise in some BLDC motors, is skewing the magnetization of the magnetic poles 25 with respect to the stator 20. Alternatively, stator teeth of the stator 20 can be skewed with respect to the rotor magnetization. As shown in FIGS. 1 and 2, the "magnetization" of the rotor 15 refers to the line pattern 31 along the length of the rotor 15 delineating alternating magnetic poles 25 on the rotor core 30.

With reference to FIGS. 2 and 3, the stator 20 includes a stator core 105 having a plurality of stator teeth 110, stator windings 112, and a back iron portion 115. In one construction, the stator core 105 includes a stack of magnetic steel laminations or sheets. In other constructions, the stator core 105 is formed from a solid block of magnetic material, such as compacted powder of magnetic steel. The stator windings 112 can include electrical conductors placed in slots 120 (i.e., the space between adjacent stator teeth 110 and receives stator windings 112) and around the plurality of teeth 110. Other constructions and types of the stator core 105 and stator windings 112 known to those skilled in the art can be used and are not limiting on the invention.

In some constructions of the motor 10, electrical current flows through the stator windings 112 and produces a magnetic field that interacts with the magnetization of the rotor 15 to provide torque to the rotor 15 and shaft 17. The electrical current can be an (m) phase alternating current (AC), where (m) is an integer greater than or equal to two. The electrical current can have various types of waveforms (e.g., square wave, quasi-sine wave, etc). The stator windings 112 receive electrical current from an electrical drive circuit.

In the construction shown in FIG. 3, the rotor 15 is produced by fixing three arc shaped magnets 26 on the rotor core 30. Other rotor designs and constructions are also possible. A magnetizer is used to produce on the rotor 15 a number of alternating magnetic poles that interact with the stator 20.

Figure 4:
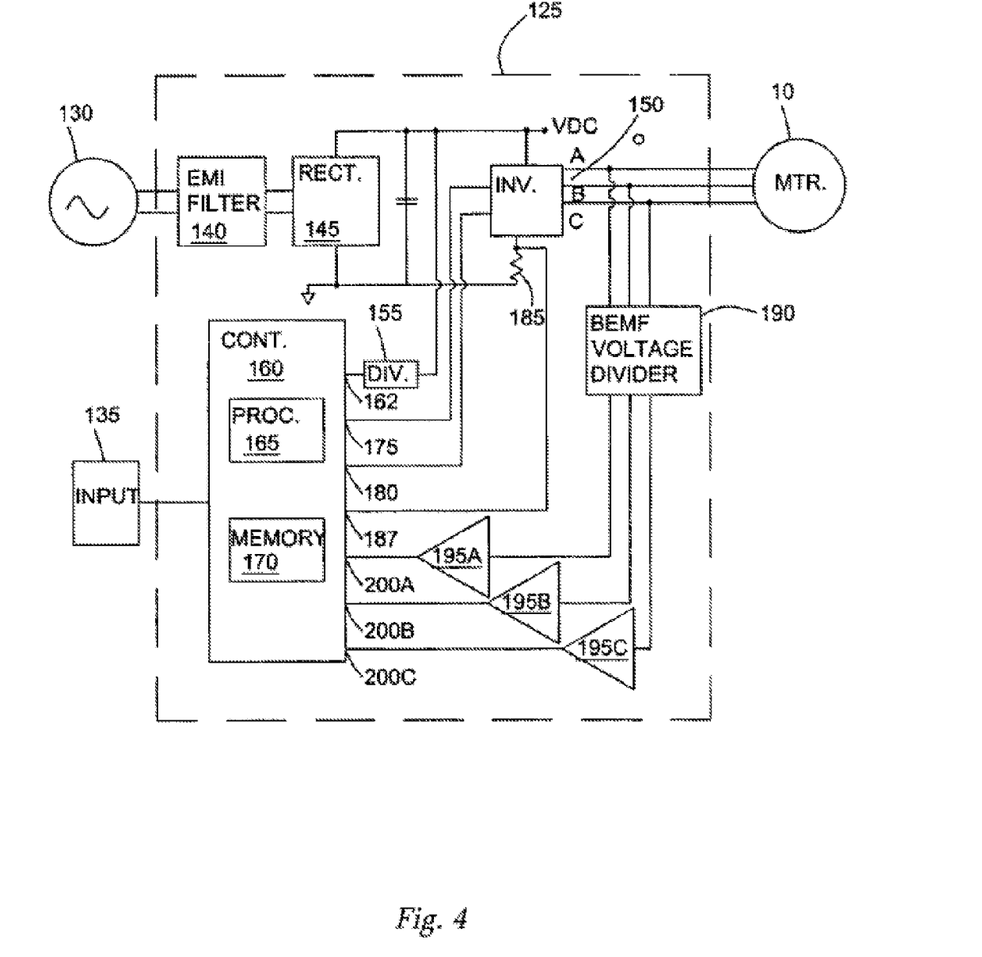
FIG. 4 is a block diagram of an electrical drive circuit for powering the electrical machine of FIG. 1.

FIG. 4 illustrates a drive circuit 125 that receives AC power from a power source 130 and drives the motor 10 in response to an input 135. The AC power is provided to a filter 140 and a rectifier 145 that filter and rectify the AC power, resulting in a bus voltage VDC. The bus voltage VDC is provided to an inverter 150 and to a voltage divider 155. The voltage divider 155 reduces the bus voltage VDC to a value capable of being acquired by a controller 160 (at a terminal 162). The controller 160 includes a processor 165 and a memory 170.

Generally speaking, the processor 165 reads, interprets, and executes instructions stored in the memory 170 to control the drive circuit 125. The controller 160, which may be in the form of a microcontroller, can include other components such as a power supply, an analog-to-digital converter, filters, etc. The controller 160 issues drive signals at terminals 175 and 180 to control the inverter 150. The inverter 150 includes power electronic switches (e.g., MOSFETs, IGBTs) to vary the flow of current to the motor 10. For example, the inverter 150 can be in the form of a bridge circuit. A sense resistor 185 is used to generate a voltage having a relation to a bus current of the inverter 150. The voltage of the sensor resistor 185 is provided to the controller 160 at a terminal 187. Other methods of sensing current can be used to sense the bus current. The controller 160 can receive values associated with phase currents and phase voltages provided by the inverter 150.

The drive circuit 125 also includes a BEMF voltage divider 190 and variable gain amplifiers 195A, 195B, and 195C. The BEMF voltage divider 190 and variable gain amplifiers 195A, 195B, and 195C provide voltage values to the controller 160 at terminals 200A, 200B, and 200C, respectively. The voltage values provided to the controller 160 by the variable gain amplifiers 195A, 195B, and 195C have a relation to the BEMF of each phase voltage.

During operation of the HVAC system 2, the motor controller 160 can start and control the motor 10 by providing drive signals to the inverter 150 based on inputs received at the controller 160. The controller 160 can receive input signals from the input interface 135 or a serial port interface. In some constructions, the input interface 135 can be configured to receive input signals from one or more voltage sensors, current sensors, and auxiliary systems. Voltage sensors and current sensors can be used to measure voltages and currents, respectively, in the motor 10 or other devices operating in cooperation with the motor 10. Thus, the voltage sensors and current sensors can be coupled or placed within the motor 10, or alternatively, these sensors can be placed at a remote location. Moreover, the drive circuit 125 can be coupled or placed within the motor 10, or alternatively in close proximity to the motor 10. Signals generated by auxiliary inputs can be received at the input interface 135 and can include signals from safety systems or other input/output devices 6 as schematically illustrated in FIG. 1.

The starting procedure of the motor 10 is stored as software instructions in the memory 170. The processor 165 reads the instructions from the memory 170, interprets the instructions, and executes the interpreted instruction resulting in the operation of the motor 10 as described below. Other circuit components (e.g., an ASIC) can be used in place of the processor 165 and the memory 170 to control the motor 10.

In some constructions of the HVAC system 2, the thermostat 3, system control board 4, and motor assembly 5 are configured to start and operate the HVAC system 2 utilizing a set of specific startup methods. For example, the thermostat 3 can generate signals indicative of temperature requirements which can turn on the motor assembly 5 and consequently the HVAC system 2. The signals generated by the thermostat 3 can be sent to the system control board 4. In some cases, the system control board 4 can be used to simultaneously control the HVAC system 2 and other input/output devices 6 such as auxiliary systems or safety devices (e.g. smoke detection systems, alarm systems, ambient humidity control). The system control board 4 can process the signals generated by the thermostat 3 to generate instructions for the motor assembly 5. The motor assembly 5 can receive the instructions from the system control board 4, utilizing a serial port interface (not shown), to drive a blower or a fan (not shown) producing generally a constant air flow, for example.

As explained above, the power signal provided to the rotor 15 generates torsional torque ripple that excites system vibration modes and results in an audible noise for a short period during ramp up. Thus, in order to avoid the audible noise during the ramp up of the BLDC motor 10, the memory 170 stores software instructions for the processor 165. The processor executes the instructions and the controller 160 starts the motor 10 by using a routine or a method that eliminates that ramp up noise.

In particular, the processor 165 starts and ramps up the motor 10 to a predetermined switch over speed with a three phase AC (sinusoidal) voltage signal instead of the three step method that can be used to commutate the motor 10. In a typical startup, the processor 165 generally runs two phases at a time and the third phase is used to receive feedback about the position of the rotor 15. The proposed startup technique uses an open loop vector-like drive and all three phases of the motor are simultaneously generating three phase sinusoidal voltage. The preprogrammed magnitude and frequency of the power signal during startup commutates the motor 10 from zero revolutions per minute ("RPM") to a predetermined switch over speed (e.g., 300 RPM).

During this startup process, the rotational speed is not monitored and, therefore, there is no feedback about the position of the rotor 15 or the BEMF produced by the motor. When the motor 10 reaches the predetermined switch over speed, the AC signal is turned off (i.e., it is disconnected by the processor 165) and the processor 165 switches to a BEMF control mode (i.e., a closed loop control, receiving feedback). In the BEMF control mode, the drive circuit 125 can estimate the rotor position through sensorless control. One of the advantages of the described startup method is that the process provides a technique for avoiding a startup noise without changing the existing hardware of the drive circuit 125 and the motor 10.

Figure 5:
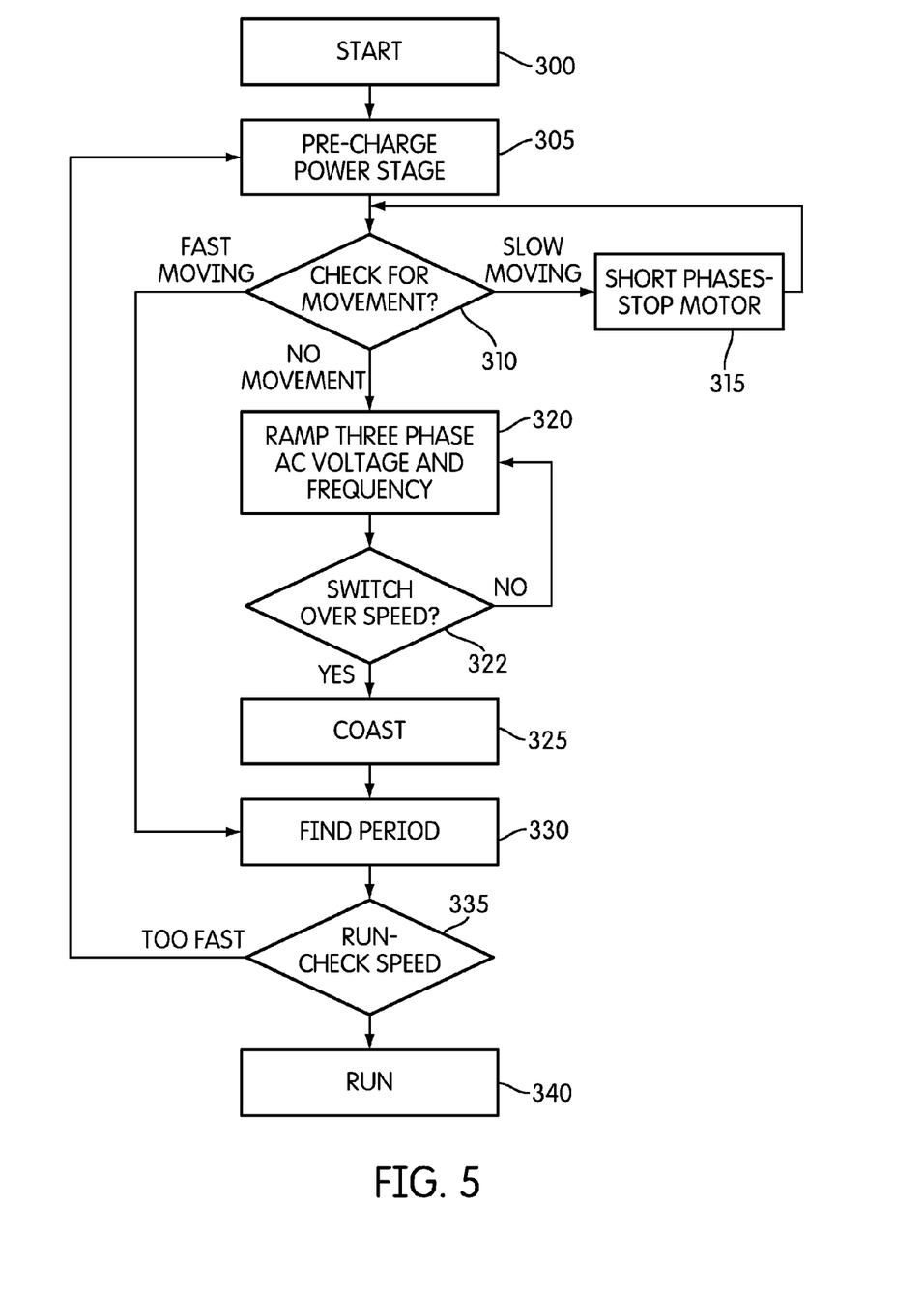
FIG. 5 is flow diagram of a start routine of the brushless permanent magnet electrical machine of FIG. 1.

FIG. 5 illustrates a flow chart describing one possible method for starting the brushless permanent magnet electrical motor 10 utilizing the electrical drive circuit 125. The process illustrated by the flow chart can be started automatically or manually (at block 300). A pre-charge power stage takes place at block 305. The pre-charge power stage can include charging energy storing devises (e.g., capacitors) that are used to develop voltages required for switching the power electronic switches (e.g., IGBTs) on. Various methods for charging the capacitors can be used.

Occasionally, the rotor 15 is in motion when the method for starting the motor 10 is initiated. The controller 160 monitors the BEMF to detect movement of the rotor 15 (at block 310). The variable gain amplifiers 195 are switched to a high gain mode to detect possible low BEMF signals produced by the motor 10. Low BEMF signals are generally indicative of significantly slow motion of the rotor 15. The controller 160 usually determines the rotational speed of the rotor 15 by measuring the time between BEMF crossings. For example, if the time between BEMF crossings increases, it is determined that the rotor 15 is slowing down. The speed of the rotor 15 may be classified as one of various states. For example, states determined by the speed of the rotor 15 can include a no moving state, a slow moving state, or a fast moving state. If the speed of the rotor 15 falls under the slow moving state, the rotor 15 is stopped by shorting phases A, B, and/or C (at block 315).

The controller 160 classifies the speed of the rotor 15 under the no moving state when there is relatively no rotation of the rotor 15. In such case, the controller 160 starts and ramps up the motor 10 to a predetermined switch over speed with a three phase AC voltage signal (at block 320). As discussed above, this is open-loop, preprogrammed magnitude and ramp to get the motor 10 from zero RPM to a switch over or transfer speed. For quiet operation of the motor 10, it is best to produce a sine wave current during ram up of the motor (at block 320). Because the motor BEMF waveform is not purely sinusoidal a sine wave current may only be produced by a modified sine wave voltage. During this motor control, the motor current is not measured. Therefore, to produce more sine wave current, the open-loop voltage waveform can be intentionally distorted during 320.

At block 322, the controller 160 checks if the motor 10 has reached the switch over speed. If the motor has not reached the switch over speed, the controller 160 continuous to ramp up the motor 10 with three phase AC voltage signal (at block 320). The controller 160 proceeds to a coast state (at block 325) when the controller 160 determines that the motor 10 has reached the switch over speed. At that time, the controller 160 turns off the inverter 150 as the rotor 15 is allowed to coast (at block 325). The controller then switches to a BEMF control mode. Monitoring the BEMF allows the controller 160 to determine a period in relation to the rotational speed of the rotor 15 (at block 330).

With reference to block 305, the controller 160 proceeds directly to determine the period (at block 330) when the rotational speed of the rotor 15 is classified under a fast moving state (at block 305). In some cases when the controller 160 determines that the rotational speed of the rotor 15 is classified under the fast moving state (at block 305), the rotor 15 may also be rotating in the reverse direction.

The controller 160 allows the rotor 15 to rotate in a forward direction after turning on the inverter 150, and monitors the BEMF for a predetermined amount of time (at block 335). The controller 160 determines if the rotational speed of the rotor 15 is above a threshold value after the predetermined amount of time. The threshold value in relation to rotational speed of the rotor 15 may vary based on factors such as the size of the motor 10 or the load coupled to the motor 10. When the speed of the rotor 15 is above the threshold value, the controller 160 returns to the hardware initialization procedure (at block 305). Alternatively, when the speed of the rotor 15 is below the threshold value, the controller proceeds to a run mode (at block 340).

Various features and advantages of the invention are set forth in the following claims.

What is claimed is:

1. A method of controlling an electrical machine including a stator having a core and a plurality of windings, and a rotor disposed adjacent to the stator to interact with the stator, the method comprising:
   detecting a movement of the rotor;
   generating a three phase alternating current (AC) voltage signal by all phases of the electrical machine;
   monitoring for a transfer speed of the electrical machine;
   discontinuing the three phase AC voltage signal when the transfer speed is traversed;
   switching to a back electromotive force (BEMF) control mode after discontinuing the three phase AC voltage signal.

2. The method of claim 1, wherein detecting movement of the rotor further includes detecting a rotational speed of the rotor.

3. The method of claim 1, wherein the three phase AC voltage signal provides an open loop ramp up of the electrical machine.

4. The method of claim 3, wherein the three phase AC voltage signal has a predetermined magnitude and frequency.

5. The method of claim 3, wherein the three phase AC voltage signal commutates the electrical machine from zero revolutions per minute (RPM) to the transfer speed.

6. The method of claim 1, wherein the transfer speed includes a predetermined speed.

7. The method of claim 6, wherein the transfer speed is about 300 RPM.

8. The method of claim 1, wherein the BEMF control mode is a closed loop control that receives feedback for the BEMF produced by the electrical machine.

9. The method of claim 1, wherein the electrical machine includes a permanent magnet, brushless direct current motor.

10. An electrical machine comprising:
    a stator having a core and a plurality of windings;
    a rotor disposed adjacent to the stator to interact with the stator;
    a memory; and
    a controller arranged to start the electrical machine, the controller configured to detect a movement of the rotor, generate a three phase alternating current (AC) voltage signal by all phases of the electrical machine, monitor for a transfer speed of the electrical machine, discontinue the three phase AC voltage signal when the transfer speed is traversed, and switch to a back electromotive force (BEMF) control mode after the three phase AC voltage signal is discontinued.

11. The electrical machine of claim 10, wherein the three phase AC voltage signal provides an open loop ramp up of the electrical machine.

12. The electrical machine of claim 10, wherein the three phase AC voltage signal has a predetermined magnitude and frequency.

13. The electrical machine of claim 10, wherein three phase AC voltage signal commutates the electrical machine from zero RPM to the transfer speed.

14. An air movement system comprising:
a system control board;
a motor assembly including
 a stator having a core and a plurality of windings, and
 a rotor disposed adjacent to the stator to interact with the stator,
a drive circuit coupled to the motor assembly and having a controller and a memory, the controller being configured to start the motor assembly, wherein starting includes detecting a movement of the rotor,
 generating a three phase alternating current (AC) voltage signal by all phases of the motor assembly,
 discontinuing the three phase AC voltage signal when the motor assembly traverses a transfer speed.

15. The air movement system of claim 14, wherein starting of the motor assembly further includes monitoring the transfer speed of the electrical machine.

16. The air movement system of claim 14, wherein starting of the motor assembly further includes switching to a back electromotive force (BEMF) control mode.

17. The air movement system of claim 14, wherein the air movement system further includes a thermostat.

18. The air movement system of claim 17, wherein the thermostat generates signals indicative of temperature requirements which can turn on the motor assembly.

19. The air movement system of claim 17, wherein the system control board relays signals generated by the thermostat to the motor assembly.

\* \* \* \* \*